United States Patent
Numata et al.

(10) Patent No.: US 7,187,359 B2
(45) Date of Patent: Mar. 6, 2007

(54) FORCE FEEDBACK DEVICE

(75) Inventors: Hidetaka Numata, Miyagi-ken (JP); Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 312 days.

(21) Appl. No.: 10/400,303

(22) Filed: Mar. 27, 2003

(65) Prior Publication Data
US 2003/0184518 A1 Oct. 2, 2003

(30) Foreign Application Priority Data
Mar. 29, 2002 (JP) ............................. 2002-097595

(51) Int. Cl.
G09G 5/00 (2006.01)

(52) U.S. Cl. .................. 345/158; 345/184; 715/701; 700/275

(58) Field of Classification Search ................ 345/156, 345/184, 162, 161, 157, 158, 163; 318/671; 463/37; 701/37; 700/275, 264, 83, 85; 74/335; 715/701, 702
See application file for complete search history.

(56) References Cited

U.S. PATENT DOCUMENTS

| | | |
|---|---|---|
| 4,437,150 A | 3/1984 | Dahlgren, Jr. et al. |
| 5,381,080 A | 1/1995 | Schnell et al. |
| 6,154,201 A | 11/2000 | Levin et al. |
| 6,278,439 B1 | 8/2001 | Rosenberg et al. |
| 6,433,771 B1 * | 8/2002 | Yocum et al. ............... 345/156 |
| 6,580,417 B2 * | 6/2003 | Rosenberg et al. ......... 345/157 |
| 6,833,846 B2 * | 12/2004 | Hasser ........................ 715/701 |
| 6,864,877 B2 * | 3/2005 | Braun et al. ................. 345/156 |
| 6,876,891 B1 * | 4/2005 | Schuler et al. ................ 700/83 |
| 2001/0002126 A1 | 5/2001 | Rosenberg et al. |

FOREIGN PATENT DOCUMENTS

| | | |
|---|---|---|
| EP | 0 305 197 | 3/1989 |
| WO | WO 97/18623 | 5/1997 |

OTHER PUBLICATIONS

Copy of Search Report dated May 17, 2006 for corresponding European Application No. 03006762.3.

* cited by examiner

Primary Examiner—Richard Hjerpe
Assistant Examiner—Abbas Abdulselam
(74) Attorney, Agent, or Firm—Brinks Hofer Gilson & Lione

(57) ABSTRACT

A force feedback device comprising an operation unit, an actuator for providing a feel sensation (force) to the operation unit and a control unit for controlling the actuator, wherein the control unit stores a plurality of different unit force patterns, forms composite force patterns by combining the unit force patterns and controls the actuator based on the composite force patterns to provide feel sensations to the operation unit.

18 Claims, 7 Drawing Sheets

FIG. 4A (UNIT 1)

FIG. 4B (UNIT 2)

FIG. 4C (UNIT 3)

FIG. 4D (UNIT 4)

FIG. 7A PRIOR ART (PATTERN 1)

FIG. 7B PRIOR ART (PATTERN 2)

FIG. 7C PRIOR ART (PATTERN 3)

FORCE FEEDBACK DEVICE

This application claims the benefit of priority under 35 U.S.C. §119 (a)–(d) to Japanese Patent Application No.: 2002-097595, which was filed on Mar. 29, 2002.

BACKGROUND OF THE INVENTION

1. Field of the Invention

The present invention relates to a force feedback device and, particularly, to a force feedback device which forms a unit force pattern to be provided to an operation unit by combining unit force patterns.

2. Description of the Prior Art

Figure 6:
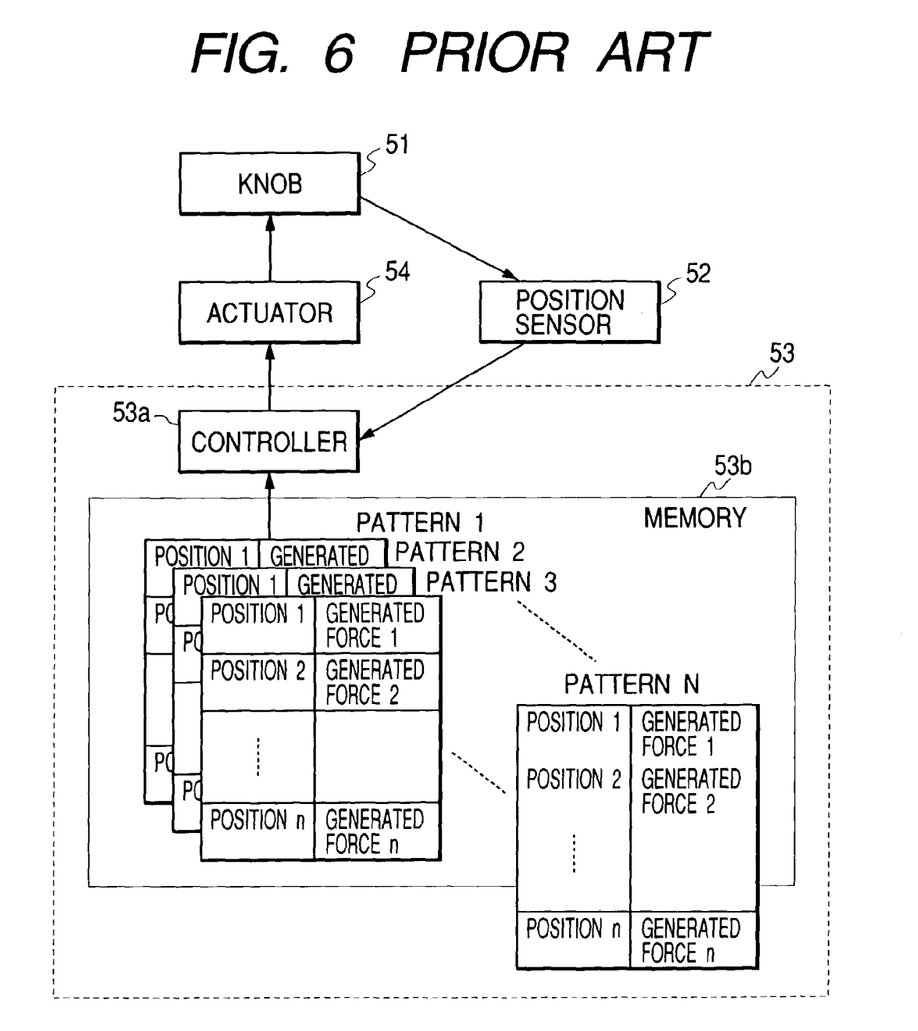
FIG. 6 is a block diagram of a force feedback device of the prior art.
Figure 7A:
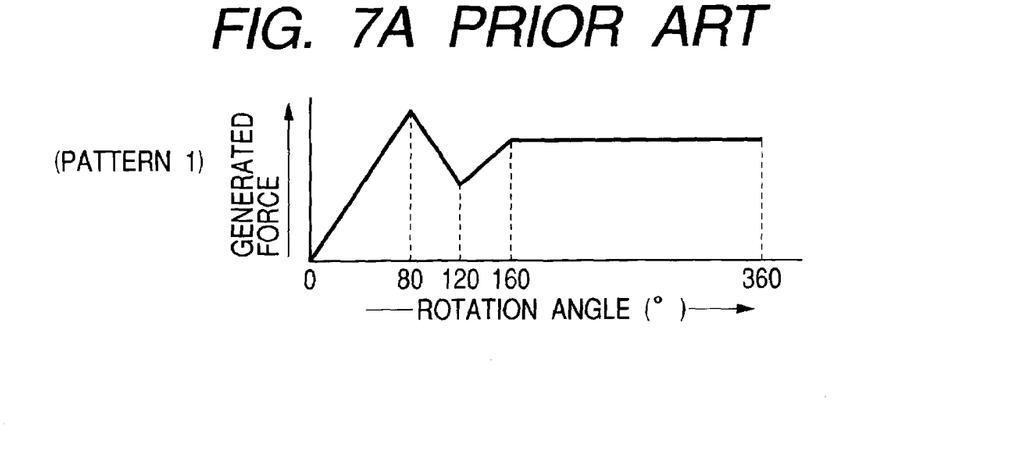
FIGS. 7A to 7C are graphs of generated forces of force patterns of the force feedback device of the prior art.
Figure 7B:
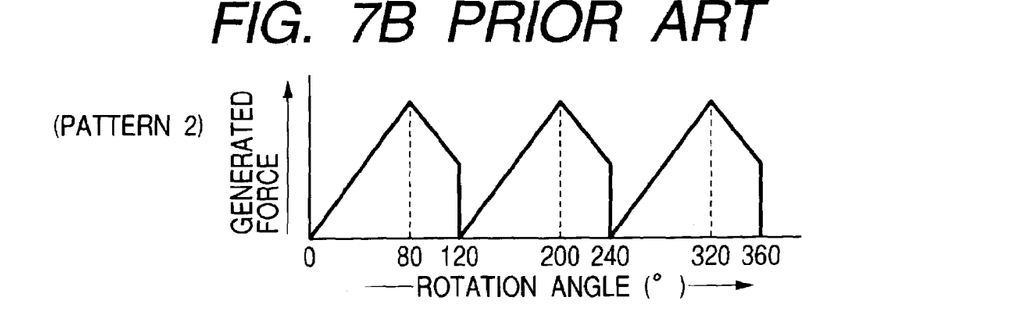
Figure 7C:
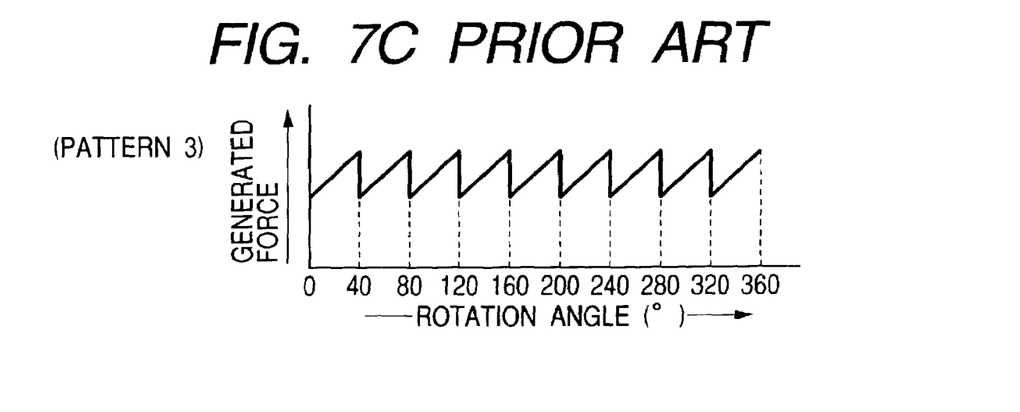

A force feedback device of the prior art will be described with reference to FIG. 6 and FIGS. 7A to 7C. FIG. 6 is a block diagram of a force feedback device of the prior art and FIGS. 7A to 7C are graphs, each showing the generated force of the force pattern of the force feedback device of the prior art.

A knob 51 as an operation unit is rotatably provided to output a predetermined function.

A position sensor 52 is, for example, a rotary encoder which is attached to the rotary shaft (not shown) of the knob 51 to detect the rotation angle position of the knob 51.

An actuator 54 is, for example, an electromagnetic coil or motor which provides its generated force to the knob 51.

A control unit 53 is made up of a controller 53a and a memory (ROM) 53b as shown in FIG. 6. The memory 53b stores tables of force patterns (patterns 1 to N) for adding the generated force from the actuator 54 to the knob 51 according to each rotation angle position, and the controller 53a receives a signal indicative of the rotation angle position of the knob 51 from the position sensor 52 and gives the actuator 54 an instruction to output its generated force corresponding to the rotation angle position stored in the specified table. The force pattern tables store generated forces (generated forces 1 to n) for the rotation angle positions (positions 1 to n) of the knob 51 based on the respective force patterns (patterns 1 to N).

The relationships between the generated forces and the rotation angles of the tables (pattern 1, pattern 2, pattern 3; see FIG. 6) are shown in the graphs of FIGS. 7A to 7C. The force pattern of pattern 1 shown in FIG. 7A provides a click feel sensation at rotation angles of 80°, 120°, 160° and 360° during one 360° rotation of the knob 51 where the inclination of the line of the graph changes. The force pattern of pattern 2 shown in FIG. 7B has three repetitions of the same pattern and provides a click feel sensation at rotation angles of 80°, 120°, 200°, 240°, 320° and 360° where the inclination of the line of the graph changes. The force pattern of pattern 3 shown in FIG. 7C has nine repetitions of the same pattern during one 360° rotation of the knob 51 and provides a click feel sensation at intervals of 40° where the inclination of the line of the graph changes. Since these force patterns have different waveforms, their click feel sensations during one rotation differ from one another.

The operation of the force feedback device of the prior art will be described hereinbelow. When the knob 51 is turned, the position sensor 52 for detecting rotation angle attached to the rotary shaft of the knob 51 detects the rotation angle of the knob 51. A signal indicative of the detected rotation angle is supplied to the control unit 53, the control unit 53 which receives the signal reads the specified table from generated force tables (pattern 1, pattern 2, . . . pattern N) corresponding to the rotation angle positions stored in the memory 53b, and the controller 53a gives the actuator 54 an instruction to output its generated force corresponding to the rotation angle position. The actuator 54 outputs the generated force specified by the controller 53a to the knob 51. The knob 51 receives the generated force of the actuator 54 and outputs a predetermined operation feel sensation.

However, in the above force feedback device of the prior art, when the number of force patterns increases, the required memory capacity grows, thereby making it difficult to prepare the required memory capacity.

SUMMARY OF THE INVENTION

It is therefore an object of the present invention to provide a force feedback device which has a small required memory capacity even when the number of different force patterns increases.

The force feedback device of the present invention includes an operation unit, an actuator for providing a feel sensation (force) to the operation unit and a control unit for controlling the actuator, wherein the control unit stores a plurality of different unit force patterns, forms composite force patterns by combining the unit force patterns and controls the actuator based on the composite force patterns to provide feel sensations to the operation unit.

Since the unit force patterns are combined together by this constitution, only a memory for storing a small number of unit force patterns and a memory for storing the line-ups of combinations of the unit force patterns are required, thereby making it possible to reduce the required total memory capacity (ROM capacity) even when the number of different force patterns increases.

One of the plurality of unit force patterns is a mountain-like one of which force increases from a predetermined value and then decreases or a valley-like one of which force decreases from a predetermined value and then increases to provide a click feel sensation.

Simply by selecting a mountain-like or valley-like unit force pattern with this constitution, a click feel sensation can be easily obtained.

One of the plurality of unit force patterns has an ascent in which force increases from a predetermined value to provide a deceleration feel sensation.

Simply by selecting a unit force pattern having an ascent in which force increases from a predetermined value with this constitution, a deceleration feel sensation can be easily obtained.

One of the plurality of unit force patterns has a descent in which force decreases from a predetermined value to provide an acceleration feel sensation.

Simply by selecting a unit force pattern having a descent in which force decreases from a predetermined value with this constitution, an acceleration feel sensation can be easily obtained.

One of the plurality of unit force patterns is like a horizontal straight line that force does not change from a predetermined value to provide a fixed force feel sensation.

Simply by selecting a horizontal linear unit force pattern that force does not change from a predetermined value with this constitution, a fixed force feel sensation can be easily obtained.

DESCRIPTION OF THE PREFERRED EMBODIMENTS

Figure 1:
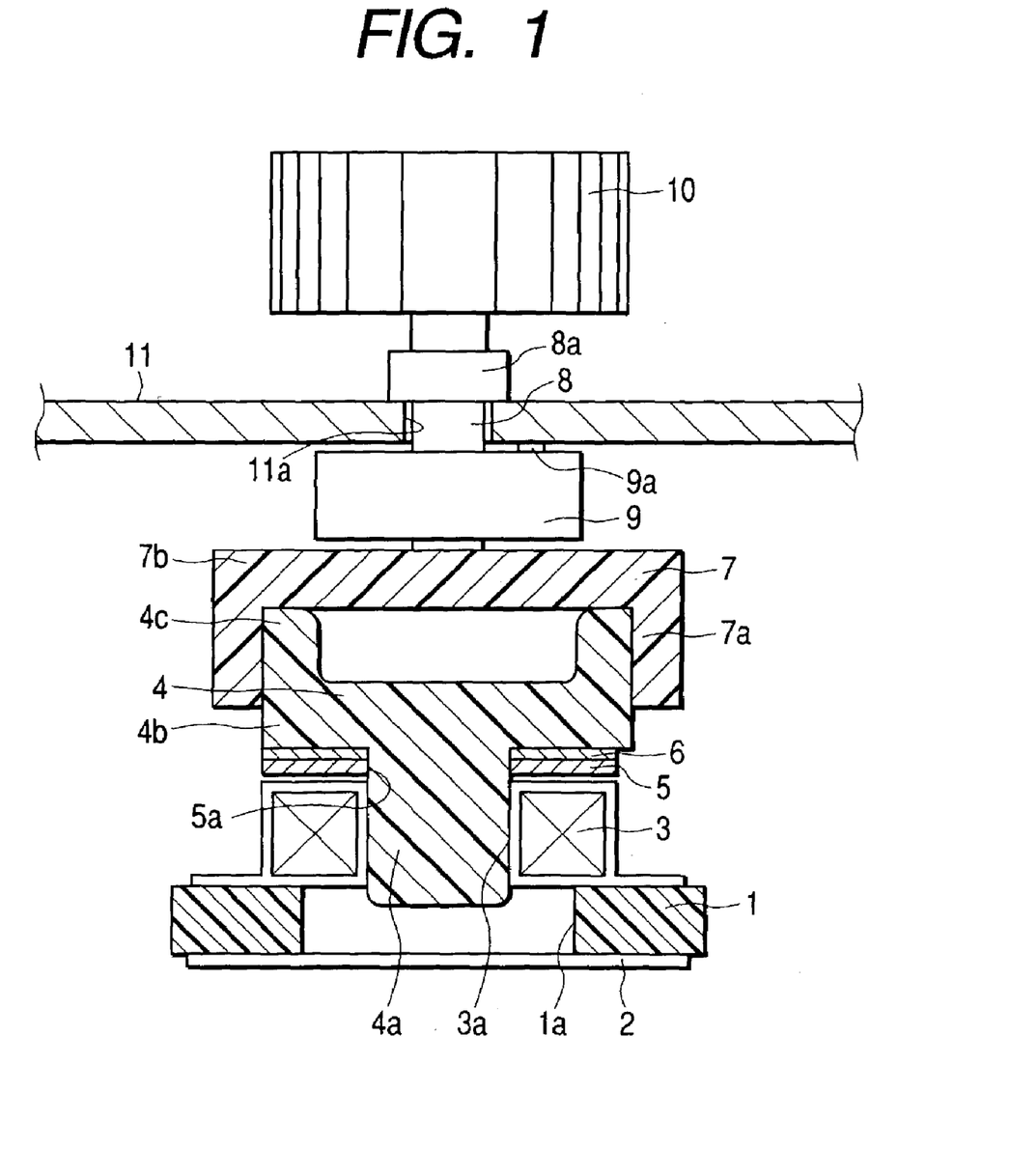
FIG. 1 is a partial sectional view of an embodiment of the force feedback device of the present invention.
Figure 2:
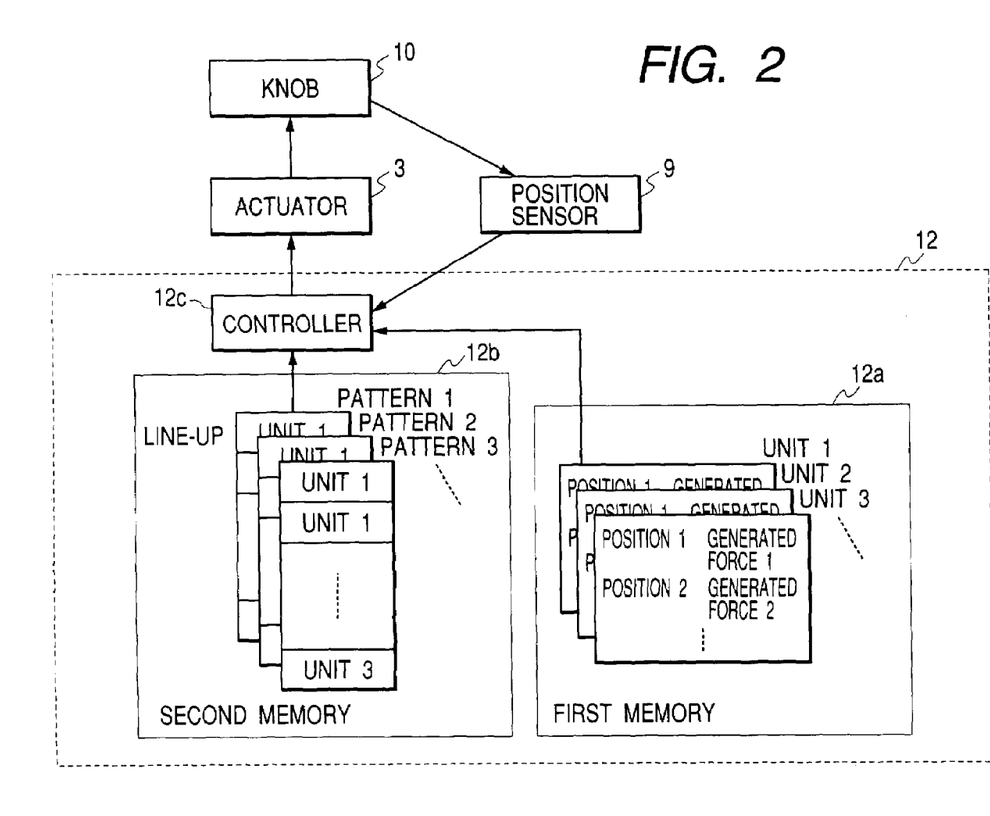
FIG. 2 is a block diagram of the embodiment of the force feedback device of the present invention.

A preferred embodiment of the force feedback device of the present invention will be described with reference to FIGS. 1 to 5. FIG. 1 is a partial sectional view of an embodiment of the force feedback device of the present invention, FIG. 2 is a block diagram of the embodiment of the force feedback device of the present invention, FIGS. 3A to 3F are graphs of composite force patterns used in the embodiment of the force feedback device of the present invention, FIGS. 4A to 4D are graphs of unit force patterns used in the embodiment of the force feedback device of the present invention, and FIGS. 5A to 5F are diagrams showing the line-ups of unit force patterns in the embodiment of the force feedback device of the present invention.

A base 1 is made from an insulating resin and annular with a hole 1a in the center.

A printed circuit board 2 is placed on the under surface of the base 1 to mount electric parts (not shown) constituting a control unit 12 required for the force feedback device.

An actuator 3 is an electromagnetic coil prepared by winding a coil round an iron core in a ring form, has a round hole 3a in the center and is mounted on the base 1.

A driver 4 is made from an insulating resin and made up of a shaft portion 4a, a disk portion 4b and a ring portion 4c. The ring portion 4c projects upward from the periphery of the disk portion 4b, and the shaft portion 4a is formed perpendicularly to the disk portion 4b at the center of the disk portion 4b. The shaft portion 4a is rotatably fitted in the round hole 3a of the actuator 3.

An armature 5 has an iron plate and is shaped like a disk having a round hole 5a in the center. One side of the armature 5 is mounted on the under surface of the disk portion 4b of the driver 4 through an armature return spring 6. The other side of the armature 5 is opposed to the top surface of the actuator 3 through a space.

An engagement member 7 is made from an insulating resin, made up of a ring side wall 7a and a bottom plate 7b and is shaped like a vessel having an opening as the ring side wall 7a projects from the periphery of the disk-like bottom plate 7b. The side wall 7a of the engagement member 7 mates with the ring portion 4c of the driver 4 such that it surrounds the ring portion 4c, whereby the engagement member 7 and the driver 4 are connected to each other.

An operation shaft 8 is made from metal and fixed in the center of the bottom plate 7b of the engagement member 7 vertically. The operation shaft 8 has a large-diameter portion 8a.

A position sensor 9 is a rotary encoder for detecting rotation angle positions, has a cylindrical form and includes a rotor and a stator (not shown). The rotor is fixed to the operation shaft 8 and the stator is provided with a projection 9a.

A knob 10 as an operation unit is made from an insulating resin and has a cylindrical form and a shaft hole (not shown) in the center. The upper end of the operation shaft 8 is fitted in the shaft hole of the knob 10.

A panel board 11 is made of a metal plate and has a coated surface and a hole 11a. The operation shaft 8 is inserted into the hole 11a of the panel board 11, and the large-diameter portion 8a of the operation shaft 8 is in contact with the top surface of the panel board 11. The projection 9a of the stator of the position sensor 9 is fitted in the unshown hole of the panel board 11 to fix the stator of the position sensor 9 to the panel board 11. The position sensor 9 is sandwiched between the panel board 11 and the engagement member 7 in the axial direction of the operation shaft 8.

A description is subsequently given of the operation of the force feedback device of the embodiment of the present invention.

When the operation shaft 8 is turned by rotating the knob 10, the driver 4 is turned by the engagement member 7. At this point, the operation shaft 8 turns the rotor of the position sensor 9 and supplies a signal indicative of the rotation angle of the rotor to the control unit 12 mounted on the printed circuit board 2. The control unit 12 picks out different unit force patterns from the unit force patterns (unit 1, unit 2, unit 3, . . . ) stored in a first memory (ROM) 12a, selects the specified line-up pattern from the line-up patterns (pattern 1, pattern 2, pattern 3, . . . ) of the unit force patterns from a second memory (ROM) 12b, lines up the unit force patterns on the selected line-up pattern to form a composite force pattern and supplies it to the controller 12c of the control unit 12.

The controller 12c gives an instruction to send a current corresponding to the composite force pattern to the actuator 3. The actuator 3 which receives the current sucks the armature 5 opposed thereto in response to the received current. The armature 5 receives from the actuator 3 suction force corresponding to the current applied to the actuator 3. At this point, the armature return spring 6 extends in the thickness direction, and the armature 5 is thereby adhered to the top surface of the actuator 3. When the knob 10 is turned in this state, since the armature 5 is adsorbed to the actuator 3, friction force corresponding to suction force is generated, thereby increasing rotation torque for turning the knob 10. Thus, predetermined rotation torque is provided to the knob 10 by friction force (generated force) based on the predetermined composite force pattern.

When a current applied to the actuator 3 is stopped, the actuator 3 loses suction force for sucking the armature 5, whereby the armature return spring 6 contracts, the armature 5 parts from the top surface of the actuator 3, and the knob 10 turns without the friction force of the armature 5.

Composite force patterns and the method of forming a composite force pattern from unit force patterns will be described hereinbelow.

FIGS. 3A to 3F show composite force patterns. As for the composite force pattern of FIG. 3A, when the rotation angle of the knob 10 is increased from zero, force (generated force) for increasing the rotation torque of the knob 10 gradually increases from zero, and stops increasing and begins to decrease at a rotation angle of 80°. When the knob 10 is further turned, generated force keeps decreasing, and stops decreasing and begins to increase at an angle of 120°. When the knob 10 is still further turned, generated force stops increasing and becomes a fixed value at 160°. In this case, a click feel sensation can be obtained at the rotation angle position where generated force changes from increasing to decreasing, the rotation angle position where generated force changes from decreasing to increasing, and at the rotation angle position where generated force stop increasing and becomes fixed. Therefore, a click feel sensation can be obtained at rotation angles of 80°, 120° and 160° during one 360° rotation.

Figure 3A:
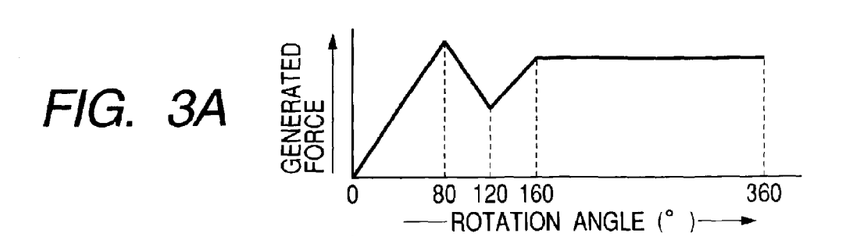
FIGS. 3A to 3F are graphs of composite force patterns used in the embodiment of the force feedback device of the present invention.
Figure 3B:
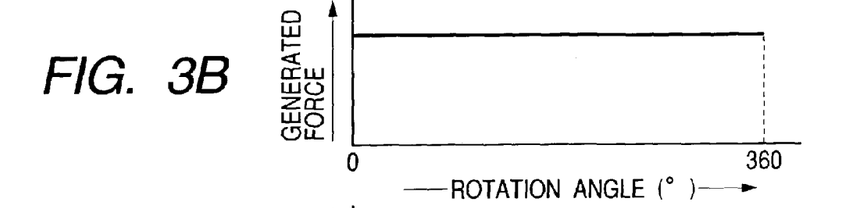

As for the composite force pattern of FIG. 3B, generated force applied to the knob 10 is fixed and rotation torque has fixed weight during one 360° rotation.

Figure 3C:
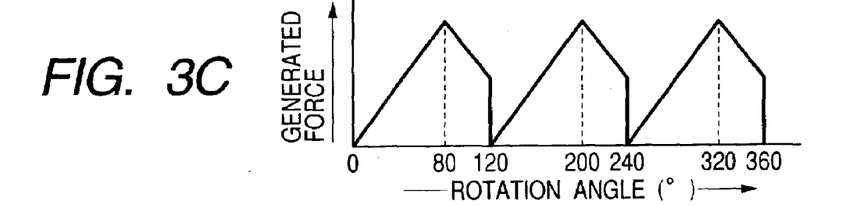

As for the composite force pattern of FIG. 3C, when the rotation angle of the knob 10 is increased from zero, generated force applied to the knob 10 increases gradually, and stops increasing and begins to decrease at a rotation angle of 80°. When the knob 10 is further turned, generated force keeps decreasing and stops decreasing at 120°. As for the composite force pattern in this case, the increase and decrease of generated force at a range of 0 to 120° repeat three times during one 360° rotation. Also in this case, a click feel sensation is obtained at the rotation angle positions where generated force changes from increasing to decreasing and the rotation angle positions where generated force changes from decreasing to increasing. Therefore, in this case, a click feel sensation is obtained six times at rotation angles of 80°, 120°, 200°, 240°, 320° and 360° during one 360° rotation.

Figure 3D:
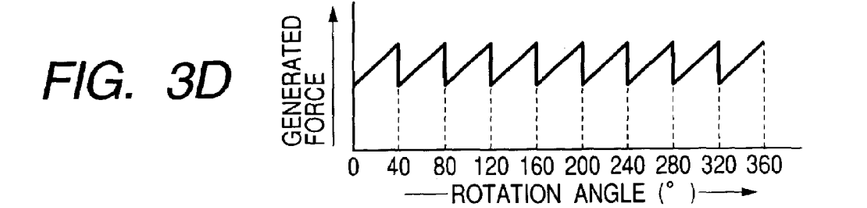

As for the composite force pattern of FIG. 3D, when the rotation angle of the knob 10 is increased from zero, generated force applied to the knob 10 gradually increases from a predetermined value and stops increasing at a rotation angle of 40°. In this composite force pattern, the change of generated force at a range of 0 to 40° repeats nine times. Therefore, a click feel sensation is obtained nine times at intervals of 40° during one 360° rotation.

Figure 3E:
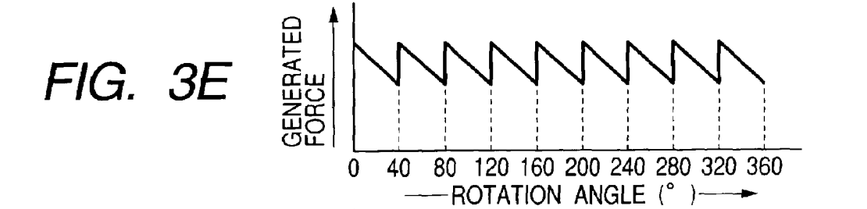

As for the composite force pattern of FIG. 3E, when the rotation angle of the knob is increased from zero, generated force applied to knob 10 gradually decreases from a predetermined value and stops decreasing at a rotation angle of 40°. In this composite force pattern, the change of generated force at a range of 0 to 40° repeats nine times during one 360° rotation. Therefore, a click feel sensation is obtained nine times at intervals of 40° during one 360° rotation.

Figure 3F:
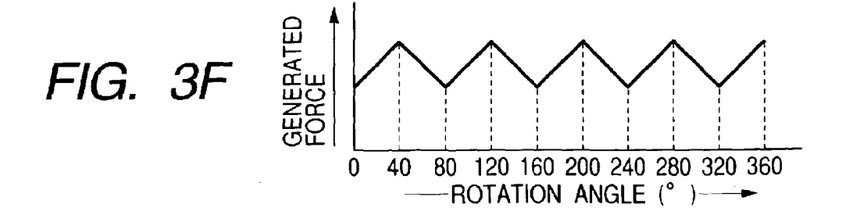

As for the composite force pattern of FIG. 3F, when the rotation angle of the knob 10 is increased from zero, generated force applied to the knob 10 gradually increases from a predetermined value and begins to decrease at a rotation angle of 40°. When the knob 10 is further turned, generated force keeps decreasing and stop decreasing at 80°. In this composite force pattern, the change of generated force at a range of 0 to 80° repeats four times during one 360° rotation and then the change of generated force at a rotation angle of 0 to 40° is added. In this case, generated force changes nine times during one 360° rotation. Therefore, a click feel sensation is obtained nine times at intervals of 40° during one 360° rotation.

Although the timings of obtaining a click feel sensation from the composite force patterns of FIGS. 3D, 3E and 3F are the same, the feel sensations differs from one another because their force patterns have different waveforms. Therefore, the click feel sensations obtained in FIG. 3A differs from the click feel sensations obtained in FIG. 3D, FIG. 3E and FIG. 3F because their composite force patterns have different waveforms. The click feel sensations at 80° in FIG. 3A and FIG. 3C are the same because their force patterns have the same waveform.

The unit force patterns for forming the above composite force patterns are shown in FIG. 4A to FIG. 4D. As for the unit force pattern of unit 1 shown in FIG. 4A, generated force gradually increases from zero at a range of 0 to 80° and gradually decreases from a value at 80° to a predetermined value at 120° at a range of 80 to 120°. In the case of the force pattern of unit 1, since generated force changes from increasing to decreasing at 80°, the operation feel sensation of the knob 10 becomes a click feel sensation at 80°.

Figure 4A:
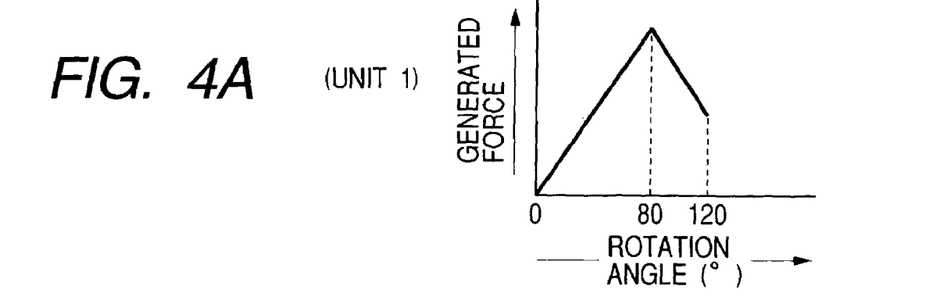
FIGS. 4A to 4D are graphs of unit force patterns used in the embodiment of the force feedback device of the present invention.
Figure 4B:
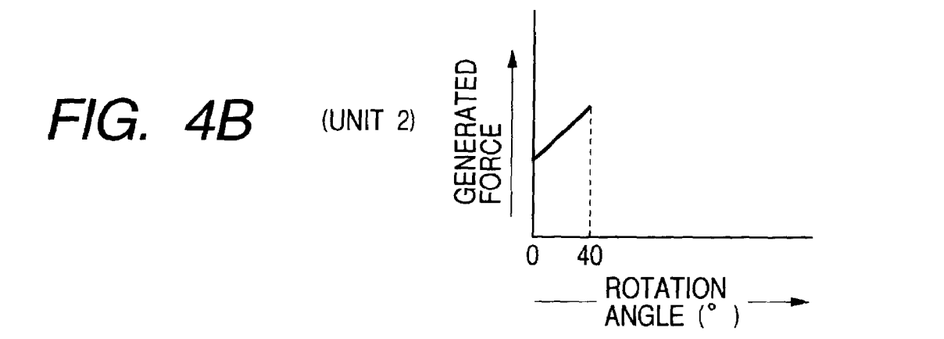

The unit force pattern of unit 2 shown in FIG. 4B has an ascent in which generated force increases from a predetermined value at a range of 0 to 40°. In the case of the unit force pattern of unit 2, since generated force grows as the rotation angle increases, the operation feel sensation of the knob 10 is a deceleration feel sensation.

Figure 4C:
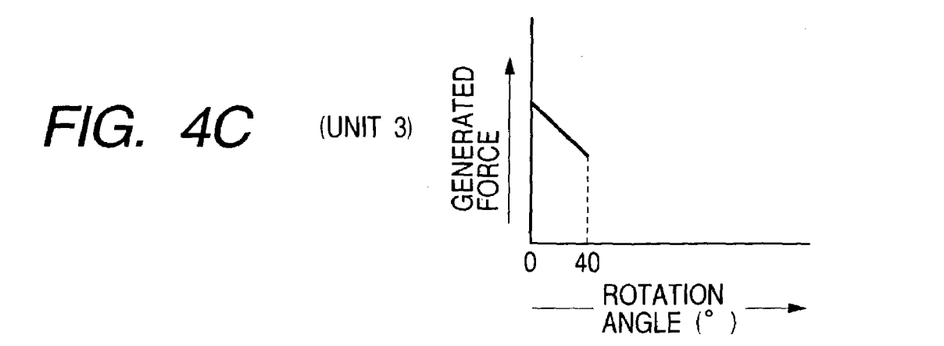

The unit force pattern of unit 3 shown in FIG. 4C has a descent in which generated force decreases from a predetermined value at a range of 0 to 40°. In the case of the unit force pattern of unit 3, since generated force decreases as the rotation angle increases, the operation feel sensation of the knob 10 is an acceleration feel sensation.

Figure 4D:
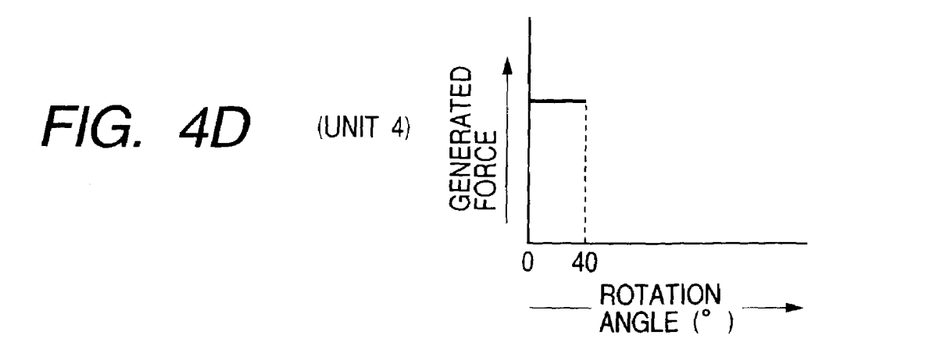

The unit force pattern of unit 4 shown in FIG. 4D is like a horizontal straight line that generated force does not change from a predetermined value at a range of 0 to 40°. In the case of the unit force pattern of unit 4, generated force is fixed and the rotation torque of the knob 10 has a fixed weight.

The above unit force patterns are stored in the first memory 12a of the control unit 12. The line-ups of the unit force patterns are stored in the second memory 12b. Nine line-up patterns are shown in FIGS. 5A to 5F.

When the number of composite force patterns is large, the total of the memory capacity for storing unit force patterns (FIG. 4A to FIG. 4D) and the memory capacity for storing the line-up patterns of the unit force patterns (FIG. 5A to FIG. 5F) is much smaller than the total of the memory capacities for storing respective composite force patterns (FIG. 3A to FIG. 3F).

Figure 5A:
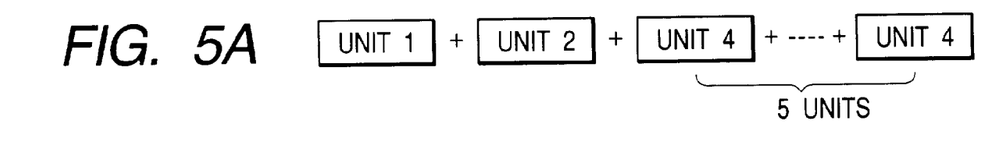
FIGS. 5A to 5F are diagrams showing the line-ups of unit force patterns in the embodiment of the force feedback device of the present invention.

To form the composite force pattern shown in FIG. 3A from unit force patterns, unit 1, unit 2 and units 4 are used such that one unit 1 and one unit 2 are arranged and then five units 4 are arranged after the unit 1 and the unit 2 as shown in FIG. 5A.

Figure 5B:
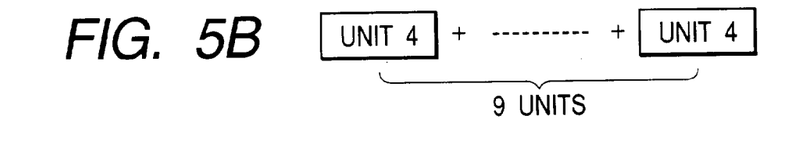

To form the composite force pattern shown in FIG. 3B from unit force patterns, units 4 are used as the unit force patterns such that nine units 4 are arranged as shown in FIG. 5B.

Figure 5C:
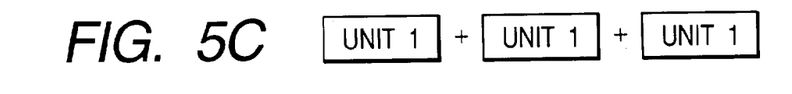

To form the composite force pattern shown in FIG. 3C from unit force patterns, units 1 are used as the unit force patterns such that three units 1 are arranged as shown in FIG. 5C.

Figure 5D:
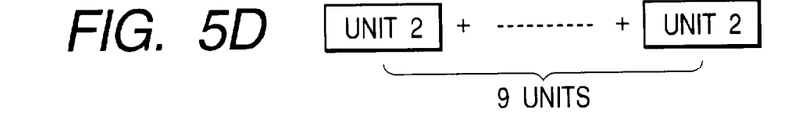

To form the composite force pattern shown in FIG. 3D from unit force patterns, units 2 are used as the unit force patterns such that nine units 2 are arranged as shown in FIG. 5D.

Figure 5E:
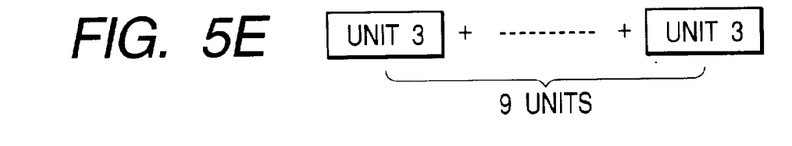
Figure 5F:
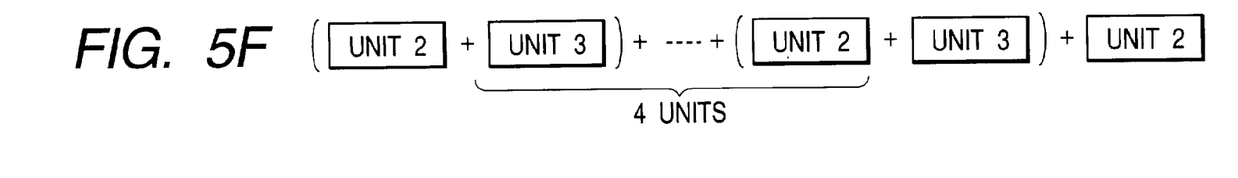

To form the composite force pattern shown in FIG. 3E from unit force patterns, units 3 are used as the unit force patterns such that nine units 3 are arranged as shown in FIG. 5E.

To form the composite force pattern shown in FIG. 3F from unit force patterns, units 2 and units 3 are used as the unit force patterns such that four pairs of a unit 2 and a unit 3 are arranged one after another and then one unit 2 is placed after these.

In the diagrams of the composite force patterns shown in FIGS. 3A to 3F, the rotation angle of 0° may be the current position of the knob 10 or a predetermined rotation position.

Thus, the composite force patterns are formed from the unit force patterns.

In the above embodiment, the one-dimensional rotation angle is used as an amount to be detected by the position sensor. The present invention is not limited to this and the position sensor may detect the amount of movement of the operation unit.

The composite force patterns of the above embodiment are not limited to combinations of the unit force patterns of the above embodiment and may be various combinations.

Mountain-like unit force patterns have been described as the unit force patterns for obtaining a click feel sensation in the above embodiment. The present invention is not limited to these and valley-like unit force patterns may be used to obtain a click feel sensation.

In the above embodiment, the actuator 3 has been described as an electromagnetic coil. The present invention is not limited to this and a DC motor may be used as the actuator 3. In this case, the DC motor is attached to the operation shaft 8 of the knob 10 directly or indirectly through a gear to give torque (generated force) in the same rotation direction as the rotation direction of the knob 10 or in the opposite direction to the rotation direction of the knob 10.

As described above, the force feedback device of the present invention includes an operation unit, an actuator for providing a feel sensation to the operation unit, and a control unit for controlling this actuator, wherein the control unit stores a plurality of different unit force patterns, forms composite force patterns by combining the unit force patterns and controls the actuator based on the composite force patterns to provide feel sensations to the operation unit.

Since the unit force patterns are combined by the above constitution, only a memory for storing a small number of unit force patterns and a memory for storing the line-ups of combinations of the unit force patterns are required, thereby reducing the required total memory capacity (ROM capacity) even when the number of different force patterns increases.

What is claimed is:

1. A force feedback device comprising an operation unit, an actuator that provides a feel sensation to the operation unit and a control unit that controls the actuator, wherein the control unit stores a plurality of unit force patterns and a plurality of line-up patterns, and a composite force pattern is formed by selecting at least one of the unit force patterns from the plurality of unit force patterns based on any one of the plurality of line-up patterns, and the actuator is controlled based on the composite force pattern.

2. The force feedback device according to claim 1, wherein one of the plurality of unit force patterns is one of a mountain pattern in which force increases from a predetermined value and then decreases and a valley pattern in which force decreases from a predetermined value and then increases to provide a click feel sensation.

3. The force feedback device according to claim 2, wherein one of the plurality of unit force patterns has an ascent in which force increases from a predetermined value to provide a deceleration feel sensation.

4. The force feedback device according to claim 3, wherein one of the plurality of unit force patterns has a descent in which force decreases from a predetermined value to provide an acceleration feel sensation.

5. The force feedback device according to claim 4, wherein one of the plurality of unit force patterns is a horizontal straight line in which force does not change from a predetermined value to provide a fixed force feel sensation.

6. The force feedback device according to claim 3, wherein one of the plurality of unit force patterns is a horizontal straight line in which force does not change from a predetermined value to provide a fixed force feel sensation.

7. The force feedback device according to claim 2, wherein one of the plurality of unit force patterns has a descent in which force decreases from a predetermined value to provide an acceleration feel sensation.

8. The force feedback device according to claim 7, wherein one of the plurality of unit force patterns is a horizontal straight line in which force does not change from a predetermined value to provide a fixed force feel sensation.

9. The force feedback device according to claim 2, wherein one of the plurality of unit force patterns is a horizontal straight line in which force does not change from a predetermined value to provide a fixed force feel sensation.

10. The force feedback device according to claim 1, wherein one of the plurality of unit force patterns has an ascent in which force increases from a predetermined value to provide a deceleration feel sensation.

11. The force feedback device according to claim 10, wherein one of the plurality of unit force patterns has a descent in which force decreases from a predetermined value to provide an acceleration feel sensation.

12. The force feedback device according to claim 11, wherein one of the plurality of unit force patterns is a horizontal straight line in which force does not change from a predetermined value to provide a fixed force feel sensation.

13. The force feedback device according to claim 10, wherein one of the plurality of unit force patterns is a horizontal straight line in which force does not change from a predetermined value to provide a fixed force feel sensation.

14. The force feedback device according to claim 1, wherein one of the plurality of unit force patterns has a descent in which force decreases from a predetermined value to provide an acceleration feel sensation.

15. The force feedback device according to claim 14, wherein one of the plurality of unit force patterns is a horizontal straight line in which force does not change from a predetermined value to provide a fixed force feel sensation.

16. The force feedback device according to claim 1, wherein one of the plurality of unit force patterns is a horizontal straight line in which force does not change from a predetermined value to provide a fixed force feel sensation.

17. A method of providing force feedback, the method comprising:

storing a plurality of unit force patterns;

storing a plurality of line-up patterns;

forming a composite force pattern by concatenating at least one of the plurality of stored unit force patterns in accordance with one of the plurality of stored line-up patterns; and converting the composite force pattern into a force applied to an actuator.

18. A force feedback device, comprising:

means for sensing a position of an operations unit;

means for forming a composite force pattern; and means for applying a composite force to an actuator wherein the means for forming a composite force pattern further comprises:

a plurality of unit force patterns stored in a control unit;

a plurality of line-up patterns stored in a control unit; and a composite force pattern formed by concatenating one or more of the plurality of unit force patterns corresponding to one of the plurality of unit force patterns and according to one of the plurality of line-up patterns.

* * * * *